M. TROWBRIDGE.
Beefsteak-Tenderers.
No. 154,198. Patented Aug. 18, 1874.
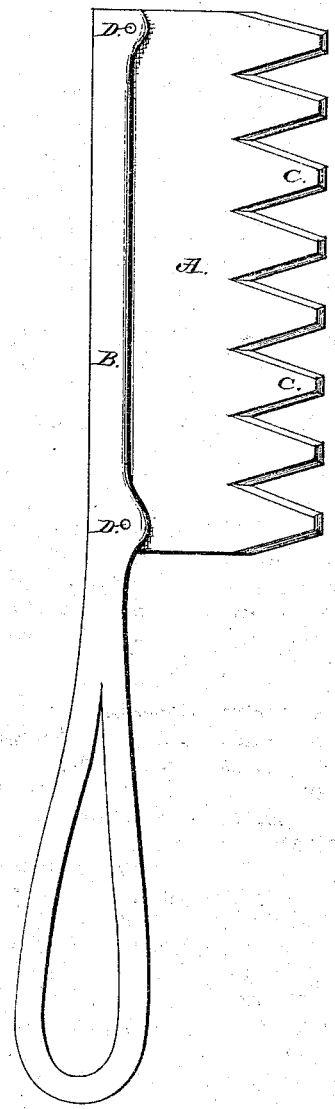
Attest:
R. C. Frey
Jno. J. Henderson
Inventor:
Michigan Trowbridge

UNITED STATES PATENT OFFICE.

MICHIGAN TROWBRIDGE, OF MEADVILLE, PENNSYLVANIA, ASSIGNOR OF ONE-HALF HIS RIGHT TO WILLIAM H. FORKER, OF SAME PLACE.

IMPROVEMENT IN BEEFSTEAK-TENDERERS.

Specification forming part of Letters Patent No. 154,198, dated August 18, 1874; application filed March 26, 1874.

*To all whom it may concern:*

Be it known that I, MICHIGAN TROWBRIDGE, of Meadville, Pennsylvania, have invented certain Improvements in Steak-Tenderers, of which the following is a specification:

My invention relates to an improvement in steak-tenderers; and it consists in forming in the edge of the blade a number of blunt-pointed, sharp-edged cutting-teeth, by means of which the fibers of the meat are separated, so as to make the meat tender and palatable.

The accompanying drawing represents my invention.

A represents a blade, of any suitable size or shape, which is attached to the handle B by the rivets D. In the lower edge of this blade there are formed a number of blunt-ended, sharp-edged cutting-teeth, C, by means of which the fibers of the meat are cut, so as to make the meat tender and palatable, and thus save mastication. The instrument is taken in the hand and used like an ordinary cleaver.

I am aware that sharp-pointed instruments of various kinds have been used for tendering steaks, and I do not, therefore, broadly claim such.

My invention consists in making the tenderer in the form and shape of a cleaver, which can be easily and quickly handled, and with which powerful blows can be struck, so as to readily cut the toughest fibers and muscles.

Having thus described my invention, I claim—

A steak-tenderer made in the form of a cleaver, and consisting of the blade A, having the blunt-pointed teeth C and handle B, substantially as shown and described.

MICHIGAN TROWBRIDGE.

Signed in presence of—
 Capt. GEO. W. BARBER,
 JNO. W. SMITH.